(12) United States Patent
Volcker et al.

(10) Patent No.: US 8,718,275 B2
(45) Date of Patent: May 6, 2014

(54) LOW COMPLEX AND ROBUST DELAY ESTIMATION

(75) Inventors: Björn Volcker, Bromma (SE); Willem Bastiaan Kleijn, Lower Hutt (NZ)

(73) Assignee: Google Inc., Mountain View, CA (US)

( * ) Notice: Subject to any disclaimer, the term of this patent is extended or adjusted under 35 U.S.C. 154(b) by 160 days.

(21) Appl. No.: 13/365,116

(22) Filed: Feb. 2, 2012

(65) Prior Publication Data

US 2013/0163698 A1  Jun. 27, 2013

Related U.S. Application Data

(60) Provisional application No. 61/579,535, filed on Dec. 22, 2011.

(51) Int. Cl.
*H04M 9/08* (2006.01)
(52) U.S. Cl.
USPC .................. 379/406.01; 379/392.01
(58) Field of Classification Search
USPC ......................... 379/406.01–406.16
See application file for complete search history.

(56) References Cited

U.S. PATENT DOCUMENTS

| | | | |
|---|---|---|---|
| 6,580,795 B1 * | 6/2003 | Li et al. | 379/406.14 |
| 6,654,463 B1 * | 11/2003 | Leonidov et al. | 379/406.08 |
| 6,704,415 B1 * | 3/2004 | Katayama et al. | 379/406.01 |
| 6,718,036 B1 * | 4/2004 | Van Schyndel et al. | 379/406.03 |
| 6,760,436 B1 * | 7/2004 | Takada | 379/406.01 |
| 6,778,671 B1 * | 8/2004 | Graumann | 381/66 |
| 6,868,157 B1 * | 3/2005 | Okuda | 379/406.01 |
| 6,898,281 B1 * | 5/2005 | Larsson et al. | 379/406.06 |

FOREIGN PATENT DOCUMENTS

WO  WO 2010/066496 A1  6/2010

* cited by examiner

*Primary Examiner* — Simon Sing
(74) *Attorney, Agent, or Firm* — Birch, Stewart, Kolasch & Birch, LLP

(57) ABSTRACT

A method and apparatus for finding an estimate of the delay of a signal travelling between two points. A quantity is evaluated from the signal at a final number of time instants, at both a reference point and a reception point. The values are quantized by comparison with a threshold adapted to a typical magnitude of the quantity. If the quantized values from the reception point are shifted back by the true delay with respect to the quantized values from the reference point, then certain co-occurrences of quantized values have very low probability. Hence, the best delay estimate is that shift which yields the least number of low-probability co-occurrences.

15 Claims, 8 Drawing Sheets

LOW COMPLEX AND ROBUST DELAY ESTIMATION

This Nonprovisional application claims priority under 35 U.S.C. §119(e) on U.S. Provisional Application No. 61/579,535 filed on Dec. 22, 2011, the entire contents of which are hereby incorporated by reference.

FIELD OF THE INVENTION

The present disclosure generally relates to methods and devices for use in communications networks. More precisely, it relates to a method and a device for estimating the delay of a signal travelling between two points in a communications network. The invention can in particular be used in applications for estimating or mitigating echo in communication equipment.

BACKGROUND

Consider an acoustic or electric signal that is known at a reference point and that travels in finite time through a system to a reception point. The delay is the time elapsed between the appearance of, say, a characteristic signal feature at the reference point and its reappearance at the reception point. In the concrete case of the system being a communications network, the delay may be the sum of the propagation time in various conducting materials, processing time in decoders and encoders, particularly conversions between analog and digital format, waiting time during routing in packet-switched networks, and possibly propagation time in air if the signal is transmitted in acoustic form in some segment of the path.

Accurate estimates of the delay of an acoustic or electric signal travelling through a system are valuable in a number of applications, for instance, in echo cancellation and echo suppression in communications equipment, de-reverberation, echo localization, alignment of audio files for the purpose of fingerprinting, and the alignment of audio signals in recording studios.

An important application of delay estimation is echo suppression and/or echo cancellation as used in telephony. In this context, a far-end party and a near-end party communicate using a telecommunications network. The near-end party would like to receive only the speech signal spoken by the far-end speaker. However, because of acoustic echo or because of network echo, the near-end party may additionally receive the (distorted and delayed) speech signal spoken by him or herself. This signal component in the signal travelling towards the near-end party is referred to as the echo signal. In the case of acoustic echo, the feedback path is acoustic and consists of acoustic speakers at the far-end and microphones that acquire the echo signal. In the case of network echo, the feedback path is electronic and results from imperfect transmission-line terminations.

To reduce the echo perceived by the near-end party, the echo signal must be decreased or eliminated. This is normally done by digital computing means using adaptive filtering (echo cancellation) and/or by gain control (echo suppression). The adaptive filter of echo cancellation is optimized to remove the signal component that correlates with the signal travelling towards the far-end party by subtracting it from the signal travelling towards the near-end party. Finding the relative delay (the bulk delay) of the signal travelling to the far end and the echo signal is implicit in this optimization and is generally based on correlation, albeit sometimes in a broad sense. An initial estimate of the bulk delay is commonly used to reduce the required number of the correlation computations for echo cancellation. In the case of echo suppression, heuristic rules are generally used to suppress the signal travelling towards the near end whenever it mostly consists of the signal spoken by the near-end party. Echo suppression requires knowledge of the relative delay between the signal travelling to the far end and the echo signal. An estimate of the relative delay is usually computed by means of cross correlation.

Available delay estimation methods for echo cancellation are generally directly or indirectly based on cross correlation. However, the cross-correlation operation has drawbacks. A first drawback is that the cross correlation method has high computational complexity for long sequences when a large search range of possible delays is used. A second drawback is that the performance of cross-correlation based methods generally deteriorates when the relation between the echo signal and the signal travelling to the far-end cannot be described accurately by a linear filtering operation. That is, performance is reduced when the feedback path introduces nonlinear distortions. A third drawback applies to systems with time-varying delay where it is difficult to balance previously determined (old) information and new information about the delay. Usage of a long but finite evaluation interval imposes large storage and computational requirements. Alternatively, an implicit exponential decay of older data must be used, such as by iterative multiplication by a factor less than unity, which generally performs less well.

The disadvantages of high computational effort, sensitivity to non-linear distortions in the feedback path, and the difficulty in removing old information motivate alternative delay estimation methods. Alternative delay estimation methods can be used to reduce the search range in echo cancellation and as a first or final estimate of the delay for echo suppression.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

An object of the present invention is to wholly or partly overcome the above disadvantages and drawbacks of the prior art and to provide improved methods and devices for delay estimation. Another objective is to provide low sensitivity to nonlinear distortions in the feedback path. It is desirable to obtain estimates having relatively high accuracy at a relatively low computational effort.

Aspects of the present invention provide a method and apparatus for finding an estimate of the delay of a signal between two points separate in space. Although aspects of the present invention do not require stable statistics, its formulation is based on the concept of joint probability of values of measurements of the signal at the reference point and of the signal at the reception point, as a function of the time delay between the measurements. The measurements can be of any suitable quantity, such as momentary or average energy content. Existing methods for delay estimation generally use averages of cross-correlations or averages of differences between measurements to evaluate the delay. In contrast, aspects of the present invention are based on counting co-occurrences of value ranges in the two sets of measurements, which forms a discrete approximation to the joint probability for data with stable statistics. It is well-known to persons skilled in the art that the joint probability provides more information about the relation between two variables than the average cross-correlation or the average difference. Thus, usage of the joint probability facilitates a better estimate of the delay.

Advantageously, the measurements are quantized into a simplified, for example binary, form by comparison with a threshold adapted to a typical magnitude of the quantity as evaluated at the reference and the reception point. Following the typical attenuation or amplification of the signal, the method may apply different thresholds at the two points for values of a given quantity. Hence, two binary sequences are obtained consisting of one-bit-quantized (i.e., Boolean) values of the quantity as evaluated at the reference point and the reception point. In the particular case of an audio signal, a binary 1 denotes strong audio activity, such as a speaker speaking, whereas a binary 0 denotes weak audio activity, such as silence or near silence.

There are four possible co-occurrences of the quantized values:

$$(0,0), (0,1), (1,0), \text{ and } (1,1) \qquad (1)$$

Here, (0,1) denotes 0 (low value) at the reference point and 1 (high value) at the reception point. Therefore, (0,0) denotes weak audio activity at both reference point and at the reception point, while (1,1) denotes strong audio activity at both reference point and at the reception point. Similar pairs can be formed from simultaneous measurements at the reception point and the reference point or from time-shifted measurements.

Consider an embodiment where the thresholds are selected in a natural manner. First suppose that a signal propagates between the reference point and the reception point without delay. Then the combination of strong audio activity at the reception point and weak audio activity at the reference point, corresponding to the pair (1,0), should not be possible in a pair, as the high value measured at the reference point should have given rise to a high value at the reception point too. In practice, this means that (1,0) has a low probability of occurrence. Now, if the delay is D, a non-zero number, the pair (1,0) may occur in pairs of simultaneously measured values. However, it is reasonable to expect that it has a low probability of occurrence when the delay has been properly compensated by back shifting, at least for backshifts by D or numbers close to D. For other back shifts than D, the pair (1,0) has a higher probability of occurrence. Thus, the delay D can be found counting the co-occurrences (1,0) for different back shifts and selecting the delay with the lowest count (relative frequency). For better performance, the other co-occurrences can also be considered.

By the method according to a first aspect of the invention, the procedure can be generalized in that the relative frequencies are not determined, but a significance is assigned to all but the least probable co-occurrence(s) and stored in a table. After defining a set of candidate delays, significances for corresponding quantized values in the binary sequences when shifted back by one of the candidate delays are read from the table and summed. By comparing the respective average weighted significances for the different candidate delays over a suitable time interval, a candidate delay corresponding to the most probable true delay can be elected. In the exemplary case discussed above, one may accordingly assign a significance of 1 to the co-occurrences (0,0), (0,1), and (1,1) and a significance of 0 to the co-occurrence (1,0).

In other embodiments, the quantity that is evaluated from the signal may be a momentary value or an average over a time segment of finite length. Suitably, the length is between 50 and 1000 milliseconds. In some embodiments, two or more of such time segments may overlap.

In an embodiment adapted to a particular operating situation, one preferably uses a quantity that is simple to evaluate and leads to a distinctive indication of the delay already with a small number of measurements. In addition to the signal energy, as previously mentioned, various embodiments may use:

- a component in an encoded audio or video format, such as an MPEG format,
- a power of the signal in a predetermined frequency band,
- an absolute value of the signal,
- an amplitude of the signal,
- an amplitude of the time-domain signal envelope,
- an integral over time of the absolute value of the signal, or
- an integral over time of the absolute value of the time derivative of the signal.

For each of the above quantities, a non-zero significance will be associated with one or more of the four possible co-occurrences (see formula (1)) in such a way that the assigned significances reflect the degree of synchronicity of two parallel sequences of measurements of a signal. The significance scores may have a quite simple structure, signifying the least probable co-occurrence(s) with no (zero), or negative significance (i.e., no figures of merit), and/or signifying the most probable co-occurrence(s) with a positive constant, and/or signifying the co-occurrences with values approximately corresponding to the expected probabilities. In either case, the candidate delay with the highest (most) likelihood will be associated with the most (signed) significance average.

In accordance with particular embodiments, more than one quantity can be evaluated from the signal. Since more information is thus available for a given number of time instants, an indication of the most likely candidate delay will then be obtained faster at the price of an increased computational load.

In one embodiment, signal powers for a windowed signal segment in a plurality of frequency bands are used as quantities. It is then advantageous to pass the signal through a filter bank, before evaluating the signal power. The filters may be digital, preferably applying some Fourier-transform method, or may be analog. The signal power of a windowed signal segment as a function of the frequency bands is referred to as a periodogram. If each component in a periodogram is then compared with a threshold, a binary vector is obtained having as many components as the periodogram. This means that if 32 bands are used, each periodogram, representing a short-time power spectrum of the signal, can be stored in a single 32-bit integer, so that the storage requirements are negligible.

In accordance with another embodiment, the values of the quantity may be quantized in more than two steps, so that multi-bit quantized values are obtained. If, for instance, the values are compared with three different thresholds, each value can be placed in one of four intervals, the transition points of which correspond to the thresholds. As is well-known, that interval of the four which contains the value can be characterized by a two-bit binary representation of its ordinal number. The number of thresholds used for reference values may be different than the number used for reception values. Although available computers generally store information in binary form, embodiments of the invention may equally well comprise a number of quantization levels that is not a power of 2. While preferably the number of thresholds is small, some application may benefit from using an increased number of thresholds at either the reference point, the reception point or both.

In one embodiment, the delay estimating device comprises at least one threshold circuit for quantizing the measured values of the at least one quantity, wherein the value of the threshold is variable and is provided by a specifying circuit. In another embodiment of the delay estimating device, the threshold circuit is adapted to quantize values of the quantity or quantities (as measured at the reference point, the reception point or both) with respect to more than one threshold for each quantity. In a further embodiment of the delay estimating device, at least one of the reference point and the reception point is located in a communications network. In other embodiments, analogously to the method according to the first aspect of the present invention, the delay estimating device may be adapted to measure at least one quantity which is a momentary value or at least one quantity which is a time average over a finite time interval. Such time intervals may or may not overlap in time.

In accordance with a third aspect of the present invention, a delay estimating device may be a component in an echo-cancelling circuit. The echo-cancelling circuit may for example contain a feed-forward adaptive filter, the quantitative characteristics of which are variable as a function of the delay estimated by the device according to the invention.

In accordance with a fourth aspect of the present invention, a delay assessment device receives quantized reference-point values and quantized reception-point values wherein each combination pair of quantized reference-point values and quantized reception-point values is associated with a quantized state. The delay assessment device includes an associating unit for associating a predetermined significance value with each combination pair of quantized reference-point values and quantized reception-point values based on the quantized state of that combination pair, a computing unit for computing average weighted significance values for each candidate delay in a set of candidate delays by weighting said predetermined significance values and then averaging said weighted significance values, wherein each pair of said plurality of combination pairs is represented by a quantized reference-point value evaluated at a first time instant and a quantized reception-point value evaluated at a second time instant, where the first time instant and the second time instant are time shifted by the candidate delay, and a selector for selecting an estimated delay time from the set of candidate delays based on the computed average weighted significances.

In accordance with a fifth aspect of the present invention, a delay estimator, for estimating a delay of a received signal between a reference point and a reception point, includes a delay assessment device that receives quantized reference-point values and quantized reception-point values wherein each combination pair of quantized reference-point values and quantized reception-point values is associated with a quantized state. The delay assessment device includes an associating unit for associating a predetermined significance value with each combination pair of quantized reference-point values and quantized reception-point values based on the quantized state of that combination pair, a computing unit for computing average weighted significance values for each candidate delay in a set of candidate delays by weighting said predetermined significance values and then averaging said weighted significance values, wherein each pair of said plurality of combination pairs is represented by a quantized reference-point value evaluated at a first time instant and a quantized reception-point value evaluated at a second time instant, where the first time instant and the second time instant are time shifted by the candidate delay, and a selector for selecting an estimated delay time from the set of candidate delays based on the computed average weighted significances. The delay estimator also includes a quantizer for quantizing a quantity from the received signal with respect to a threshold to generate said received quantized reference-point values and said received quantized reception-point values.

According to an embodiment of the present invention, each candidate delay in the set of candidate delays is a multiple of a time-distance between consecutive time intervals.

According to another embodiment of the present invention, the weights in the said average weighted significances are based on the quantized reference-point values.

In accordance with a sixth aspect of the present invention, a delay estimator, for estimating a delay of a received signal between a reference point and a reception point, includes a delay assessment device that receives quantized reference-point values and quantized reception-point values wherein each combination pair of quantized reference-point values and quantized reception-point values is associated with a quantized state. The delay assessment device includes an associating unit for associating a predetermined significance value with each combination pair of quantized reference-point values and quantized reception-point values based on the quantized state of that combination pair, a computing unit for computing average weighted significance values for each candidate delay in a set of candidate delays by weighting said predetermined significance values and then averaging said weighted significance values, wherein each pair of said plurality of combination pairs is represented by a quantized reference-point value evaluated at a first time instant and a quantized reception-point value evaluated at a second time instant, where the first time instant and the second time instant are time shifted by the candidate delay, and a selector for selecting an estimated delay time from the set of candidate delays based on the computed average weighted significances. The delay assessment device provides a first estimated delay time at a first time instance and a second estimated delay time at a second time instance, said second time instance occurring at a time instance after said first time instance, and the estimated delay time selected from the set of candidate delays based on the computed average weighted significances corresponds to said first estimated delay time. The delay estimator also includes a delay estimator selector selecting between the first estimated delay time and the second estimated delay time as a final estimated delay time.

According to an additional embodiment of the present invention, the delay estimator selector selects between the first estimated delay time and the second estimated delay time based upon a comparison between a quality metric computed for the first estimated delay time, and the second estimated delay time.

According to another embodiment of the present invention, the delay assessment device determines a predetermined significance value based on an expected probability of simultaneous occurrence of quantized values based on the quantized state of that combination pair.

According to a further embodiment of the present invention, the delay estimator may also include a first shift register storing the quantized reference-point values; and a second shift register storing the quantized reception-point values.

In accordance with a seventh aspect of the present invention, a delay estimator, for estimating a delay of a received signal between a reference point and a reception point, includes a delay assessment device that receives quantized reference-point values and quantized reception-point values wherein each combination pair of quantized reference-point values and quantized reception-point values is associated with a quantized state. The delay assessment device includes an associating unit for associating a predetermined significance value with each combination pair of quantized reference-point values and quantized reception-point values based on the quantized state of that combination pair, a computing unit for computing average weighted significance values for each candidate delay in a set of candidate delays by weighting said predetermined significance values and then averaging said weighted significance values, wherein each pair of said plurality of combination pairs is represented by a quantized reference-point value evaluated at a first time instant and a quantized reception-point value evaluated at a second time instant, where the first time instant and the second time instant are time shifted by the candidate delay, and a selector for selecting an estimated delay time from the set of candidate delays based on the computed average weighted significances. The delay assessment device also includes a first evaluator for evaluating the received signal at the reference point to generate reference-point values, a second evaluator for evaluating the received signal at the reception point to generate reception-point values, and a quantizer for quantizing said reference-point values and said reception-point values with respect to a threshold to generate said received quantized reference-point values and said received quantized reception-point values.

In accordance with a eight aspect of the present invention, a delay estimator, for estimating a delay of a received signal between a reference point and a reception point, includes a first evaluator for evaluating the received signal at the reference point to generate reference-point values, a second evaluator for evaluating the received signal at the reception point to generate reception-point values, a first quantizer for quantizing said reference-point values with respect to a first threshold to generate quantized reference-point values, a second quantizer for quantizing said reception-point values with respect to a second threshold to generate quantized reception-point values wherein each combination pair of quantized reference-point values and quantized reception-point values is associated with a quantized state, and delay assessment circuit. The delay assessment circuit associates a first predetermined significance value with a first combination pair of quantized reference-point values and quantized reception-point values based on the quantized state of the first combination pair, associates a second predetermined significance value with a second combination pair of quantized reference-point values and quantized reception-point values based on the quantized state of the second combination pair, computes average weighted significance values for each candidate delay in a set of candidate delays by weighting said first and second predetermined significance values and then averaging said weighted significance values, wherein each pair of said plurality of combination pairs is represented by a quantized reference-point value evaluated at a first time instant and a quantized reception-point value evaluated at a second time instant, where the first time instant and the second time instant are time shifted by the candidate delay, and selects an estimated delay time from the set of candidate delays based on the computed average weighted significances.

According to an embodiment of the present invention, the delay assessment circuit associates a third predetermined significance value with a third combination pair of quantized reference-point values and quantized reception-point values based on the quantized state of the third combination pair, and associates a fourth predetermined significance value with a fourth combination pair of quantized reference-point values and quantized reception-point values based on the quantized state of the fourth combination pair.

According to another embodiment of the present invention, the delay assessment circuit assigns a significance value of a first value to one of said four combination pairs that is associated with a lowest probability of occurrence among said four probabilities and the delay assessment circuit assigns a significance value of a second value to three of said four combination pairs that is not associated with the lowest probability of occurrence among said four probabilities, where the significance value of the second value is a greater value than the significance value of the first value.

According to a further embodiment of the present invention, the delay assessment circuit assigns a significance value of a first value to a first of said four combination pairs that is associated with a lowest probability of occurrence among said four probabilities, said delay assessment circuit assigns a significance value of a second value to a second of said four combination pairs that is associated with a highest probability of occurrence among said four probabilities, the significance value of the second value is a greater value than the significance value of the first value, the delay assessment circuit assigns a significance value of a third value to a third of said four combination pairs that is associated with a lower-middle probability of occurrence among said four probabilities and that is not associated with the lowest and the highest probability of occurrence among said four probabilities, the significance value of the third value is a value greater than the significance value of the first value and less than the significance value of the second value, and the delay assessment circuit assigns a significance value of a fourth value to a fourth of said four combination pairs that is associated with a higher-middle probability of occurrence among said four probabilities and that is not associated with the lower-middle, the lowest, and the highest probability of occurrence among said four probabilities, the significance value of the fourth value is a value greater than the significance value of the first value and greater than the significance value of third value and less than the significance value of the second value.

According to another embodiment of the present invention, the delay assessment circuit provides a first estimated delay time at a first time instance and a second estimated delay time at a second time instance, said second time instance occurring at a time instance after said first time instance. The delay estimator includes a delay estimator selector that selects between the first estimated delay time and the second estimated delay time based upon a comparison between the first estimated delay time, the second estimated delay time, and a quality metric.

In accordance with a ninth aspect of the present invention, a system includes a delay assessment device that receives quantized reference-point values and quantized reception-point values wherein each combination pair of quantized reference-point values and quantized reception-point values is associated with a quantized state. The delay assessment device includes an associating unit for associating a predetermined significance value with each combination pair of quantized reference-point values and quantized reception-point values based on the quantized state of that combination pair, a computing unit for computing average weighted significance values for each candidate delay in a set of candidate delays by weighting said predetermined significance values and then averaging said weighted significance values, wherein each pair of said plurality of combination pairs is represented by a quantized reference-point value evaluated at a first time instant and a quantized reception-point value evaluated at a second time instant, where the first time instant and the second time instant are time shifted by the candidate delay, and a selector for selecting an estimated delay time from the set of candidate delays based on the computed average weighted significances. The system includes an adaptive filter for performing said echo canceling or said echo suppression, where the adaptive filter includes an adaptive filter input unit receiving an input audio signal at a reception-point, an audio signal at a reference-point and the estimated delay time; an echo canceling or echo suppression unit performing said echo canceling or said echo suppression on said received audio input signal based on the estimated delay time; and an adaptive filter output unit outputting an audio output signal, wherein the audio output signal is an altered version of said received audio input signal.

According to an embodiment of the present invention, the received audio input signal is provided to said adaptive filter by a microphone.

Further scope of applicability of the present invention will become apparent from the Detailed Description given below. However, it should be understood that the Detailed Description and specific examples, while indicating preferred embodiments of the invention, are given by way of illustration only, since various changes and modifications within the spirit and scope of the invention will become apparent to those skilled in the art from this Detailed description.

BRIEF DESCRIPTION OF DRAWINGS

These and other objects, features and characteristics of the present disclosure will become more apparent to those skilled in the art from a study of the following Detailed Description in conjunction with the appended claims and drawings, all of which form a part of this specification. In the drawings:

Figure 1:
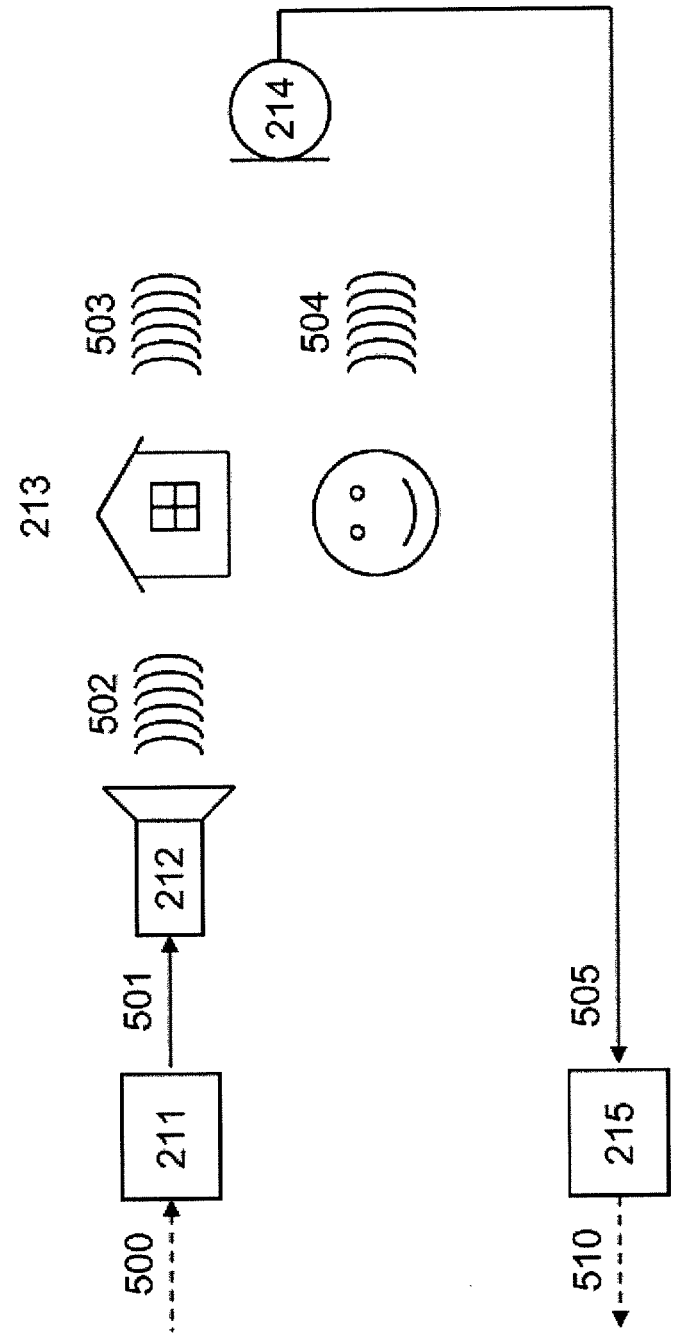
FIG. 1 is a diagram of one aspect of an acoustic feedback loop according to aspects of the invention.

The headings provided herein are for convenience only and do not necessarily affect the scope or meaning of the claimed invention.

In the drawings, the same reference numerals and any acronyms identify elements or acts with the same or similar structure or functionality for ease of understanding and convenience. The drawings will be described in detail in the course of the following Detailed description.

DETAILED DESCRIPTION

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other obvious features not described in detail herein. Additionally, some well-known structures or functions may not be shown or described in detail below, so as to avoid unnecessarily obscuring the relevant description.

FIG. 1 shows the acoustic feedback loop commonly present in hands-free communication devices such as computers used for voice-over-IP speaker phones or hands-free telephones. The technical problem to be solved can be exemplified by the case of a telephone call involving one near-end party and one far-end party. The input signal 500 is the speech signal spoken by the near-end party. It arrives at the far-end in digital format, and can be in the form of a compressed bit stream. Decoder 211 contains a digital-to-analog (D/A) converter that converts the signal to a continuous-time analog signal. If the signal is compressed then decoder 211 uses a decoding algorithm to decompress the signal as well. Analog signal 501 is sent to one or more speakers 212, which generate an acoustic signal 502 that is subjected to the room transfer function 213. The modified acoustic signal 503 is acquired by the microphone 214. Microphone 214 may additionally have the input 504, spoken by the far-end party, and other far-end generated acoustic signals. The analog signal 505 that forms the output of the microphone is sent to encoder 215 that either performs an analog-to-digital (A/D) conversion or an analog-to-digital conversion followed by compression by means of any suitable algorithm. The resulting bit stream 510 is transmitted to the near-end party.

It will be clear to a person skilled in the art that even when signal 504 is not active (is zero), signal 510 generally differs significantly in amplitude and spectral colouring from signal 500, and is delayed. Without appropriate compensation, the near-end party will receive a delayed and distorted copy of the speech signal spoken by him or herself. This echo that the near-end party hears makes conversation difficult. To remove the problem, echo cancellation and/or suppression is used. The computational effort to perform echo cancellation and suppression is significantly reduced if the delay of signal 510 relative to signal 500 is known. Aspects of the present invention are adapted to estimate the delay between the signal 500 sent from the near end and the signal 510 received at the near end, using only signals 500 and 510 as input to the estimation procedure. Therefore, echo cancellation and suppression is also an important application of the present disclosure.

Now, a method will be described in terms of the information that is received and processed. In an illustrative example, the quantity used for estimating the delay between the signals will be the signal power in different frequency bands. More precisely, the measurement of the signal 500 at the reference point and the measurement of the signal 510 at the reception point are modeled, respectively, as functions $x(t)$, $y(t)$ of continuous time. For the purpose of processing, the method will consider P time intervals $T_p=(t_p^{(1)}, t_p^{(2)})$, $p=1, \ldots, P$, and Q frequency bands (these could correspond to the frequency interval of a Fourier-transform) $F_q=(f_q^{(1)}, f_q^{(2)})$, $q=1, \ldots, Q$. By conventional analog filtering or by digital processing, a periodogram is computed for each signal and each time interval. In time interval $T_p$ the periodogram of $x(t)$ is the non-negative real vector $\xi_p=(\xi_{1,p}, \xi_{2,p}, \ldots, \xi_{Q,p})$, where $$\xi_{q,p} = \int_{F_q} |\int_{T_p} e^{-j2\pi ft} x(t) w(t) dt|^2 df \qquad (2)$$

and $w(t)$ is a window, which advantageously can be chosen to be the Hann window. For discrete-time processing the time integral is replaced by a summation and no integration in frequency is used; q then simply indexes the frequency bins. Similarly, the periodogram of y(t) is $$\eta_{q,p} = \int_{Fq} |\int_{Tp} e^{-j2\pi ft} y(t) w(t) dt|^2 df. \quad (3)$$

For later convenience the term channel is defined to mean the vector $\xi_q = (\xi_{q,1}, \ldots, \xi_{q,P})$, and its counterpart for the signal at the reception point.

Fixing thresholds $\tilde{\xi}_1, \tilde{\xi}_2, \ldots, \tilde{\xi}_Q$, each representing a lowest significant level of signal power, each periodogram is quantized into a binary Q-vector where $X_p = (X_{1,p}, X_{2,p}, \ldots, X_{Q,p})$, where $$X_{q,p} = \begin{cases} 1 & \text{if } \xi_{q,p} \geq \tilde{\xi}_q \\ 0 & \xi_{q,p} < \tilde{\xi}_q. \end{cases} \quad (4)$$

Similarly, one fixes thresholds for the other signal to obtain $$Y_{q,p} = \begin{cases} 1 & \text{if } \eta_{q,p} \geq \tilde{\eta}_q \\ 0 & \eta_{q,p} < \tilde{\eta}_q. \end{cases} \quad (5)$$

The thresholds can also be the average channel values, the median channel values or any other quantile value of the channels. A buffer will collect these binary vectors into finite sequences, in other words binary matrices, $X = (X_1, \ldots, X_{K+D_M})$ and $Y = (Y_1, \ldots, Y_K)$; the constants used in the indices will be defined shortly. In the multiple level case the thresholds can for example be different quantile values of the channel. Further, the matrices will not be a collection of binary vectors, but integer vectors.

As established above, significances for each of the four possible co-occurrences are now assigned in accordance with their expected probabilities, which are known a priori by empirical studies or can be estimated with sufficient accuracy. For the exemplary situation described above, the significances can be chosen as per the fourth column of Table 1, which will be further discussed below. Note that the periodogram values $X_{q,p}$ and $Y_{q,p}$, represent, in general, different time intervals. Furthermore, note that it is not necessary for the embodiment to work that a probability distribution can be defined. A strength of the method is that it works even when the statistics of the measurements are time-variant.

TABLE 1

| $X_{q,p}$ | $Y_{q,p}$ | Probability at correct delay | significance | significance, 1st alt. | significance, 2nd alt. |
|---|---|---|---|---|---|
| 0 | 0 | 0.25 | 1 | 1 | 0.25 |
| 0 | 1 | 0.30 | 1 | 0 | 0.30 |
| 1 | 0 | 0.05 | 0 | −1 | 0.05 |
| 1 | 1 | 0.40 | 1 | 2 | 0.40 |

It is emphasized that this approach is different from calculating the cross correlation between the two signals. The cross correlation is a function of the time shifts, the maximum of which occurs exactly when the time-shifted signals exhibit the largest degree of likeness. In other words, co-occurrences (1,1) and (0,0) correspond to a large contribution to the value of the cross correlation, whereas co-occurrences (0,1) and (1,0) do not. This simple search for likeness is not suitable in an arbitrary situation. For instance, when the feedback path is nonlinear, cross correlation performs poorly. Moreover, even when the delay varies somewhat over time, the present method will perform well, while cross correlation methods generally will fail due to the lack of a joint probability distribution that is stable in time.

M candidate delays $D_1 < D_2 < \ldots < D_M$, each expressed as a multiple of the distance of consecutive time instants, are then defined. Then the average weighted significance for each candidate delay is computed. Thus, for the $q^{th}$ quantity, the $m^{th}$ candidate delay and with averaging over K time instants, the average weighted significance is given by $$S_q(D_m) = \sum_{k=1}^{K} v_k(X_{k+D_m}) \cdot \text{significance}(X_{q,k+D_m}, Y_{q,k}), \quad (6)$$

where the weights $v_k(x)$ can be a function of the binary vector at the reference-point to emphasize, for example, the signal power. The weights can also reflect the significance importance in time, by for example decrease with increasing k, or simply be a standard average for which $v_k = 1/K$.

If weighted averaging is performed over K time instants, the shortest candidate delay is $D_1$ and the longest candidate delay is $D_M$, the binary matrices X and Y are required to have $K+D_M-D_1$ and K columns, respectively, as indicated above. It is not essential that K time instants are used for calculating the average weighted significance $S_q(D_m)$ for all candidate delays. If in some embodiment it is desirable to use an equal number of columns in the matrices, the method may perform averaging over a smaller number of time instants for the larger candidate delays, so that no extra columns to the right need to be included in X.

Figure 5:
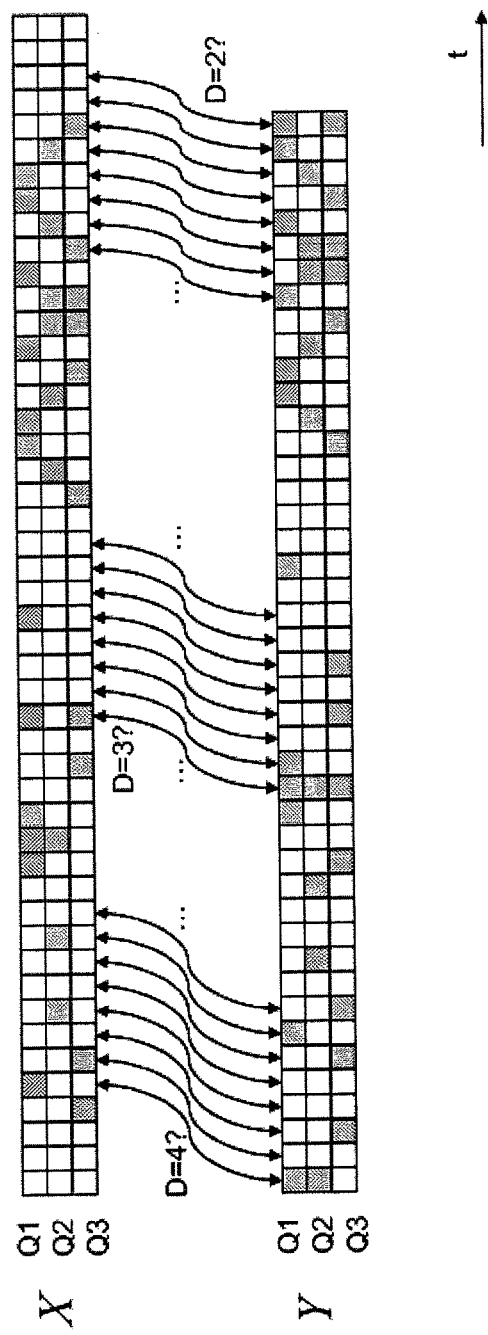
FIG. 5 illustrates one aspect of an algorithm for assessing synchronicity of the quantized values according to aspects of the invention.

The computing of average weighted significances is schematically illustrated in FIG. 5, which shows matrices X and Y in a case where Q=3, K=44 and $D_M=4$. Each square element corresponds to a matrix entry and its colour illustrates its (Boolean) value. Looking at the patterns one may guess that matrix X is matrix Y delayed (i.e., right-shifted) by 2 units plus some noise, and the method as disclosed by embodiments of the present invention is adapted to return 2 as an estimated delay in this case. Sequences of curved arrows illustrate which columns are to be compared for the candidate delays 2 (denoted by "D=2?"), 3 (denoted by "D=3?"), and 4 (denoted by "D=4?"). The elliptic dots indicate that the sequences of arrows should go on up to the outermost columns, so as to make use of all available information. It is noted that the two rightmost columns in X are not used when the average weighted significances for candidate delay 2 are computed.

A particular embodiment of the present invention does not compare consecutive pairs of time instants, but compares every other pair, every third pair, etc. Put differently, equation (6) is replaced by a modified average weighted significance:

$$S'_q(D_m) = \sum_{k=1}^{K} v_k(X_{kN+D_m}) \cdot \text{significance}(X_{q,kN+D_m}, Y_{q,kN}), \quad (7)$$

where N is an integer defining the spacing of the pairs of time instants to be compared. Instead of having $K+D_m-D_1$ and K columns, respectively, matrices X and Y then have $KN+D_m-D_1$ and KN columns. This embodiment is advantageous in virtue of its reduced computational load.

The weight $v_k(X_{k+D_m})$ is a function of the binary vector $X_p$ at the reference-point, evaluated at the time interval $p=k+D_m$, to increase robustness. Consider for example a case where we have a weak signal at the reference-point. In such a case the binary vectors at the reference-point consists of almost all zeros, and it will likely be no audible echo at the reception-point. It is therefore intuitive to scale all Q quantities to lower the impact of erroneous combinations. One example of such a scaling is to sum all binary values as $$v_k(X_{k+D_m}) = \sum_{q=1}^{Q} a_q \cdot X_{q,k+D_m}, \quad (8)$$

hence a strong signal will get higher importance than a weak signal. We have here added coefficients $a_1, a_2, \ldots, a_Q$ to preferably reflect the importance attributed to each of the quantities. This type of robustness can also be included in the significance itself by extending the 2-tuple formalism throughout the text to (Q+1)-tuples, hence dealing with 2 to the power of (Q+1) co-occurrence combinations. This would change equation (6) to $$S_q(D_m) = \sum_{k=1}^{K} \text{significance}(X_{k+D_m}, Y_{q,k})$$

and equation (7) correspondingly.

After the full set of average weighted significances has been determined, weighted sums can be formed as per $$S(D_m) = \Sigma_{q=1}^{Q} c_q \cdot S_q(D_m), \quad (9)$$

where coefficients $c_1, c_2, \ldots, c_Q$ preferably reflect the importance attributed to each of the quantities. For instance, if the quantities are audio energies in different frequency bands, a frequency band in the audible range should be given a greater importance, particularly if the energy content of the signal is expected to be relatively high in this frequency band. Similar effect may be achieved by summing the average weighted significances using equal coefficients in (8) provided the significances of relatively important quantities generally have larger magnitudes than those of relatively less important quantities.

Having produced the weighted sums $S(D_1), S(D_2), \ldots, S(D_m)$, it is now a straightforward matter to find the largest (signed) value. The corresponding delay among the candidate delays $D_1, D_2, \ldots, D_M$ is the winning one, and will be the best estimate, denoted $\hat{D}_m$.

Table 1 above shows two alternative sets of significances in addition to those discussed above, which penalizes the least probable event (1,0) only. As (1,0) is expected to have low probability for the correct delay it is penalized, proportionally to the number of times it occurs. The first alternative set of significances is simple in so far as the significances are integer numbers that reflect the unequal counts expected for (0,0), (0,1) and (1,1). Again, as (1,0) should not occur for the correct delay, it is assigned a negative significance. The co-occurrences (0,0) and (1,1) are weak indicators that the delay is correct and for this reason receive a positive significance. Co-occurrence (0,1) does not provide information about the correctness of the candidate delay and therefore is assigned a neutral (zero) significance. It is noted that for the first two significance sets, knowledge about the probability distribution of the co-occurrences is not required. The second alternative set of significances in Table 1 consists of the probabilities themselves.

Since the overall significance $S(D_m)$ always has a maximum value, the algorithm (as disclosed in regards to Equations 1 through 9) will always produce a delay estimate $\hat{D}_m$ independent of the quality of the estimation. Therefore, in situations when there is a lack in strong co-occurrences, the differences between the overall significance for each candidate delay is small and the probability of the best candidate delay also representing the true delay is small. This can happen when there is noise as input or when there are long sections with near end speech or silences. One method to overcome this is by averaging over long enough time intervals (K) to be sure of capturing strong co-occurrence events. However, at the same time, this increases the complexity. Therefore, a second method to overcome this problem is to incorporate older delay estimates into the decision, since older delay estimates may have been stronger candidates at time evaluated and the true delay may not have been changed.

In this final step, a quality metric may be defined in order to be used for comparison between delay estimate candidates. In this example, the overall significance is used as a quality metric. This method provides a low complexity solution and using the overall significance as a quality metric is also very reasonable considering a high significance value indicates a strong match between the far end and the near end signals. Further, there are two alternative delay values that may be used: 1) the delay estimate $\hat{D}_m$ calculated according to the procedure above, and 2) the final delay value $d_{i-1}$ used the last time a decision was made, where i is an index incremented every time a new decision is made. Each feasible alternative is associated with a quality, which in this example is their overall significance adjusted to current decision index i. For alternative 1) above, that becomes the, just calculated, overall significance $S(\hat{D}_m)$ and for alternative 2) a scaled version of the quality of $d_{i-1}$, that is, $b \cdot s_{i-1}$, where $s_{i-1}$ is the quality of the final delay value at decision index $i-1$ and $0 \leq b \leq 1$ is a scaling. The scaling is a user set parameter to account for the delay uncertainties over time. In relatively stable environments, the value is set close (or closer) to 1 while in unreliable environments the value is set close (or closer) to 0. Once we have two quality metric values to compare ($S(\hat{D}_m)$ versus $b \cdot s_{i-1}$), a decision may be made for which value to be the final delay value as defined by $$d_i = \begin{cases} d_{i-1}, & S(\hat{D}_m) < b \cdot s_{i-1} \\ \hat{D}_m, & S(\hat{D}_m) \geq b \cdot s_{i-1} \end{cases}$$

with corresponding update on quality metric values:

$$s_i = \max\{S(\hat{D}_m), b \cdot s_{i-1}\}$$

Figure 6:
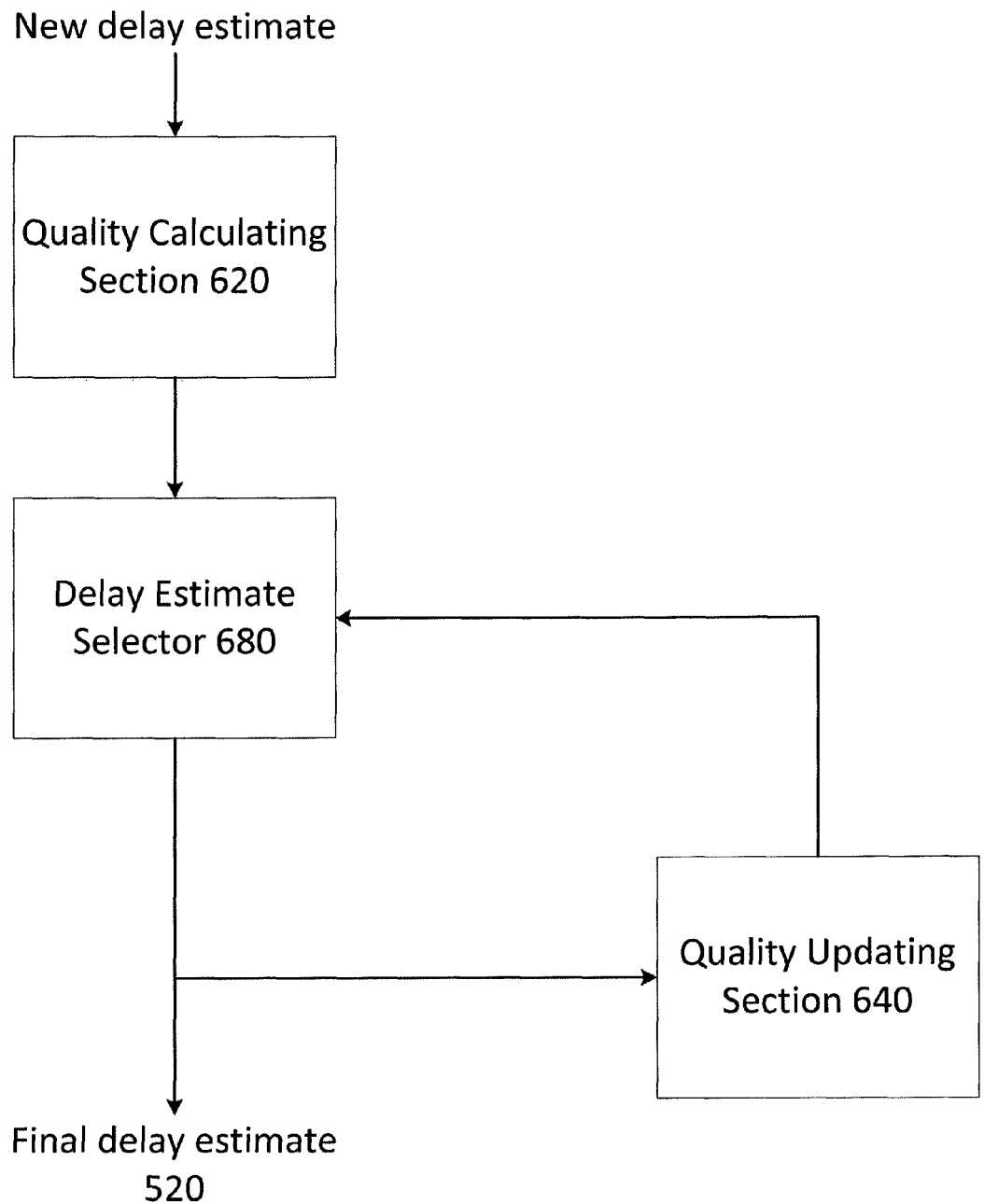
FIG. 6 is a circuit diagram of one aspect of a delay estimate quality circuit 120 according to an embodiment of the invention.

In FIG. 6, the quality of the estimate $\hat{D}_m$ is calculated in a first quality calculating section 620 (also referred to as a first quality calculating circuit 620). Also, in FIG. 6, the quality of the estimate $d_{i-1}$ is updated in a quality updating section 640 (also referred to as a quality updating circuit 640).

Figure 2:
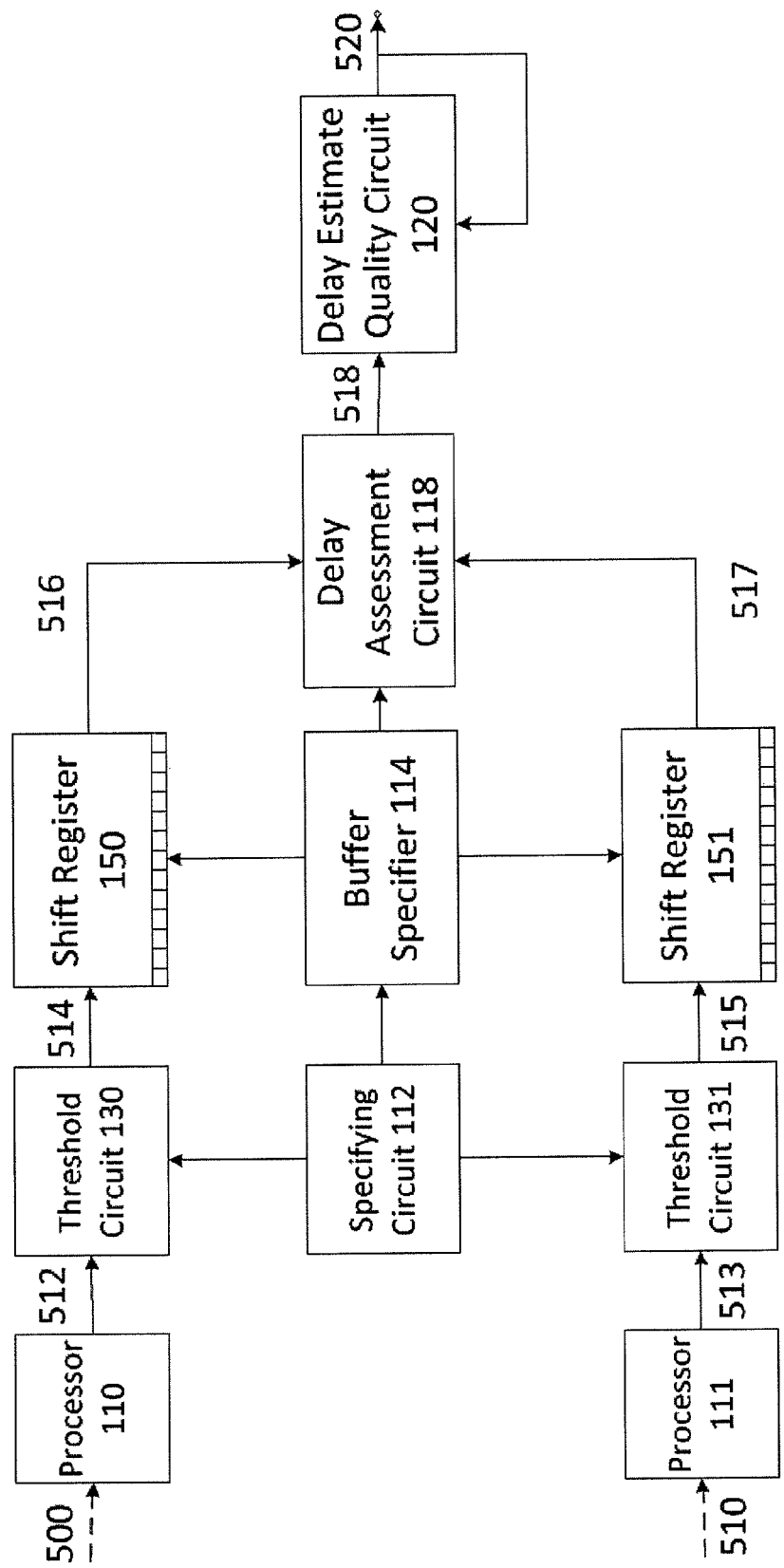
FIG. 2 is a circuit diagram of one aspect of a delay estimation system according to aspects of the invention.

A delay estimating circuit according to accepts of the present invention will now be described with reference to FIG. 2. Two signals 500 and 510 form the input. These two signals may correspond to the acoustic echo feedback path illustrated in FIG. 1, or any other set of signals that form the input and the output of a physical system. More generally, they can be any two signals such that the second contains a delayed copy of the first.

Figure 3:
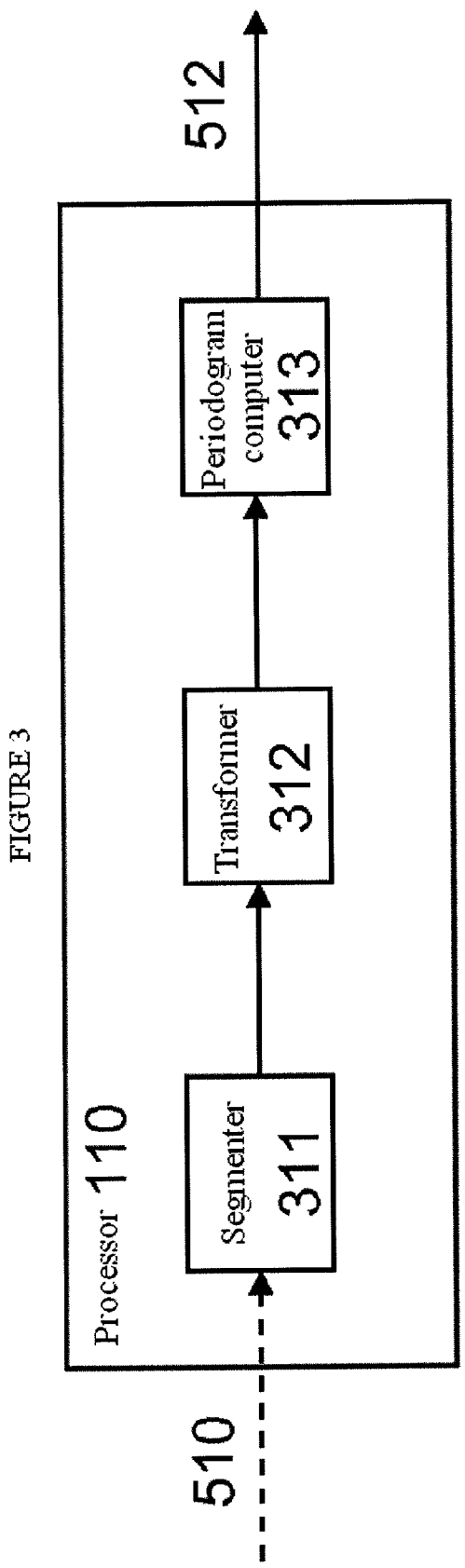
FIG. 3 is a circuit diagram of one aspect of an apparatus for pre-processing signal data according to aspects of the invention.

Each of the input signals 510 and 500 is separately pre-processed in pre-processors 110 and 111 (also referred to as evaluators, evaluation circuits, or evaluation sections), which have identical functionalities. It should be noted that the system of FIG. 2 is not limited to two pre-processors (and two processing paths), the system of FIG. 2 may have any number more than two pre-processors (hence, having any number more than two processing paths). The output of each pre-processor is a sequence of vectors (or scalars). Advantageously, that is, if signal energy in a plurality of frequency bands are used as quantities, vector sequences 512 and 513 are sequences of periodograms for the input signals 510 and 500, respectively. FIG. 3 shows the operation of pre-processor 110 in more detail. Pre-processor 111 functions similarly. The input signal 510 is first segmented into time segments that may overlap in a segmenter 311. Advantageously, the successive segments created by segmenter 311 are separated in time by 10 ms and the segments have a length of 20 ms. A transformer 312 performs a windowing and Fourier-transform operation. The output of transformer 312 is a discrete, short-time complex spectrum. Periodogram computer 313 takes this complex spectrum and applies the absolute operator to each spectrum component and squares the results to render a periodogram 512, which is a short-term power spectrum estimate. The periodogram is a vector property of the signal segment that is the output of segmenter 311.

Returning to FIG. 2, the specifying circuit 112 stores what subset of channels is to be used for delay estimation. Thus, the specifying circuit 112 specifies the active channels. Specifying circuit 112 also stores the thresholds that are to be applied to the active channels. A first and second threshold circuit 130 and 131 determine for each active channel whether the value for the current segment is above or below the threshold. This operation is equivalent to one-bit quantization. Vector signals 514 and 515 are a time-sequence of bit vectors, in which each one-bit component expresses the value of an active part of the periodogram (representing a short-term power spectrum) relative to the thresholds set by specifier 112. It should be noted that the use of the specifying circuit 112, the first threshold circuit 130, and/or the second threshold circuit 131 (individually or in any combination) may be referred to as a quantizer (or a quantizing section, quantizing circuit, etc.)

Advantageously, each of the vectors of vector signals 514 and 515 can be stored in a single digital integer number, reducing storage requirements on most computing devices significantly. This approach is particularly efficient if 32 or 64 channels are active, as the combined hardware and software on many computing devices are adapted to handle 32-bit integers and 64-bit integers. Note also that this method of using integers to denote the one-bit quantization index facilitates generalization for multiple thresholds. The output is then an index that requires for m thresholds $\log_2 (m+1)$ bits to be described. Thus each vector has $\log_2 (m+1)$ bit planes that each can be described by an integer. Below, a bit vector written in the form of a single integer (one-bit quantization) will be called a spectral integer. However, it is understood that in certain applications and for certain channel numbers, bit vectors are used without being stored as spectral integers.

Buffer specifier 114 specifies the length of a first and second shift register 150, 151. For reasons already stated above, the second shift register 151 can be shorter than the first shift register 150. Thus, the buffer specifier specifies how many spectral integers are stored in shift registers 150 and 151 for each active channel. Whenever a new spectral integer is acquired, the least recent spectral integer is discarded. It is the age of the latest discarded spectral integer (the length of the shift register) that is specified by buffer specifier 114. Advantageously this age is the same for all channels in signal 514 and, separately, for all channels in signal 515.

The actual age used depends on the signal that the delay is estimated for. If the delay is constant, the accuracy of the delay estimate increases with the length of the buffer. If the delay is changing, then an age that is a good compromise for the rate of change of the delay must be selected. In this embodiment this is determined by a designer of the system, but automated procedures can also be used for this purpose. As seen above, the lengths of the buffers can be calculated on the basis of the largest candidate delay, the desired number of time instants to be compared and, when applicable, their consecutive spacing.

A delay assessment circuit 118, which can be implemented in a number of different ways, is adapted to calculate the average significance for each candidate delay. In the conceptually simplest implementation, the delay assessment circuit 118 receives the entire buffer content 516, 517 from buffers 150, 151 and makes computations according to equation (6). From the results of the computations, the assessment circuit 118 outputs a signal indicative of the estimated delay (518). It should be note that the delay assessment circuit 118 may include an associating unit, a computing unit, and a selector.

A delay estimate quality circuit 120, which can be implemented in numerous ways, is adapted to compare previous delay estimates (520) with the newly calculated one (518) as discussed in detail above. It should be noted that the comparing of the previous delay estimates (520) with the newly calculated one (518) to select a final delay estimate with the best/highest quality (as discussed above) may be implemented directly into the delay assessment circuit 118, eliminating the need for the delay estimate quality circuit 120. In other words, the delay estimate quality circuit 120 may be internal to the delay assessment circuit 118.

Figure 4:
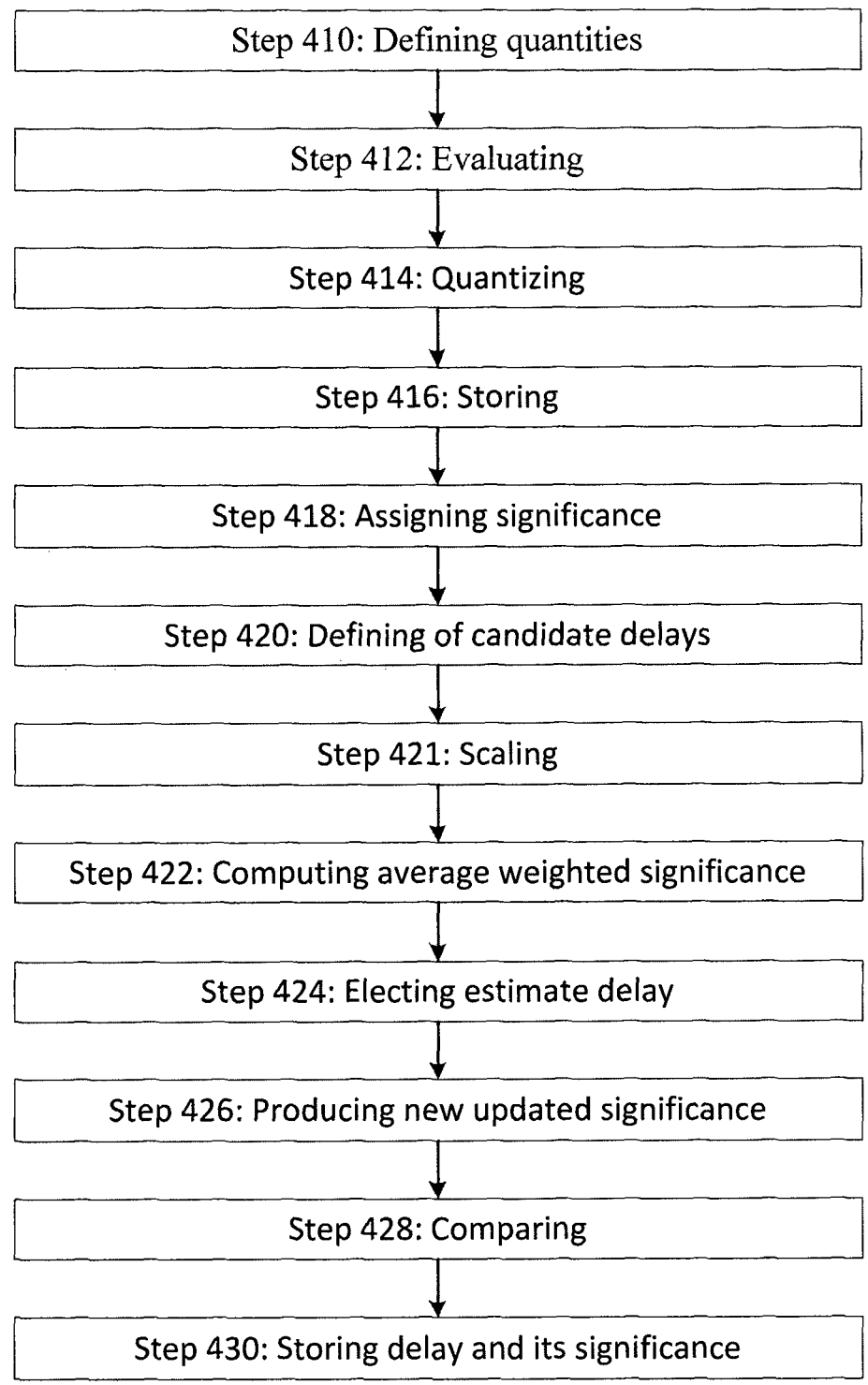
FIG. 4 is a flowchart of one aspect of a method for estimating a delay of a signal according to aspects of the invention.

FIG. 4 illustrates an embodiment of a method 400 according to aspects of the invention for estimating the delay of a signal between a reference point and a reception point. FIG. 4 is a flowchart depicting the steps of the method in the case of three quantities and five candidate delays. In step 410, the three quantities are defined. Next, in step 412, each of the quantities is evaluated at the reference point and the reception point at a plurality of time instants. In step 414, the values of the three quantities are quantized by comparison with thresholds. The thresholds are time-invariant in the sense that for each quantity, an equal threshold is used for all time instances. Subsequently, in step 416, the most recent quantized values are stored. A significance is assigned to each of the possible ordered pairs of simultaneous quantized values; this is step 418. In step 420, a set of five candidate delays are defined. In step 421, the scaling is defined and calculated for each candidate delay. Then, in step 422, an average weighted significance is computed for each candidate delay. The average is based on the three quantities and a plurality of pairs of quantized values. In step 424, an estimate delay is elected from the set of candidate delays on the basis of the computed average weighted significances. In step 426, the significance for the delay corresponding to the output of this procedure from last time is scaled by a pre-defined value, producing a new updated significance. In 428, the scaled value in 426 is compared with the corresponding significance of the elected candidate in 424, and the final delay estimate is the one corresponding to the highest significance. Finally, in step 430, both the delay and its significance are stored such that they may to be used next time in 426. It is noted that step 418 may be performed at any instant after the step 410 of defining the quantities and before the step 422 of computing an average weighted significance.

While the invention has been illustrated and described in detail in the drawings and foregoing description, such illustration and description are to be considered illustrative or exemplary and not restrictive; the invention is not limited to the disclosed embodiment. It is understood that some components that are included in the disclosed embodiments are optional. For example, decoders and encoders may not be present if the invention is embodied in a public telephone network according to older standards.

Other variations to the disclosed embodiments can be understood and effected by those skilled in the art in practicing the claimed invention, from a study of the drawings, the disclosure, and the appended claims. The mere fact that certain measures are recited in mutually different dependent claims does not indicate that a combination of these measured cannot be used to advantage. Any reference signs in the claims should not be construed as limiting the scope.

Figure 7:
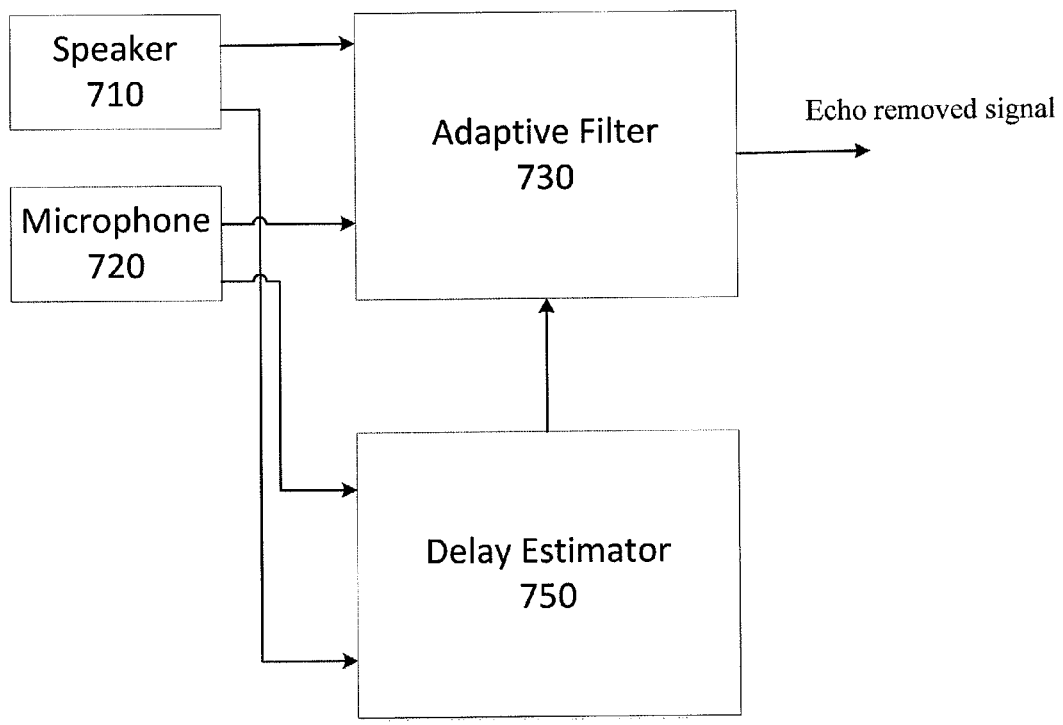
FIG. 7 is a circuit diagram of one aspect of echo canceller/suppressor according to an embodiment of the invention.

FIG. 7 illustrates one example of an echo canceller system and/or an echo suppressor system which includes an adaptive filter 730 and a delay estimator 750.

The delay estimator 750 provides the delay estimate and/or the final delay estimate to the adaptor filter, as discussed above in relation to FIGS. 1 through 6. Therefore, the details of the calculation and determination of the delay estimate and/or the final delay estimate in incorporated herewith. The delay estimator 750 receives an input signal from the microphone 720 (microphone 720 may be microphone 214, and microphone 720 may also be referred to as the far-end party) and an input signal from the speaker 710 (speaker 710 may be speaker 212, and speaker 710 may also be referred to as the near-end party). Based on the received input signals the delay estimator 750 generates and provides the delay estimate and/or the final delay estimate to an adaptive filter 730. The adaptive filter 730 performs echo cancellation and/or an echo suppression and outputs a corrected signal (as referred to as an Echo removed signal) based on the output of the speaker 710, the output of the microphone 720, and the output of the delay estimator 750.

Figure 8:
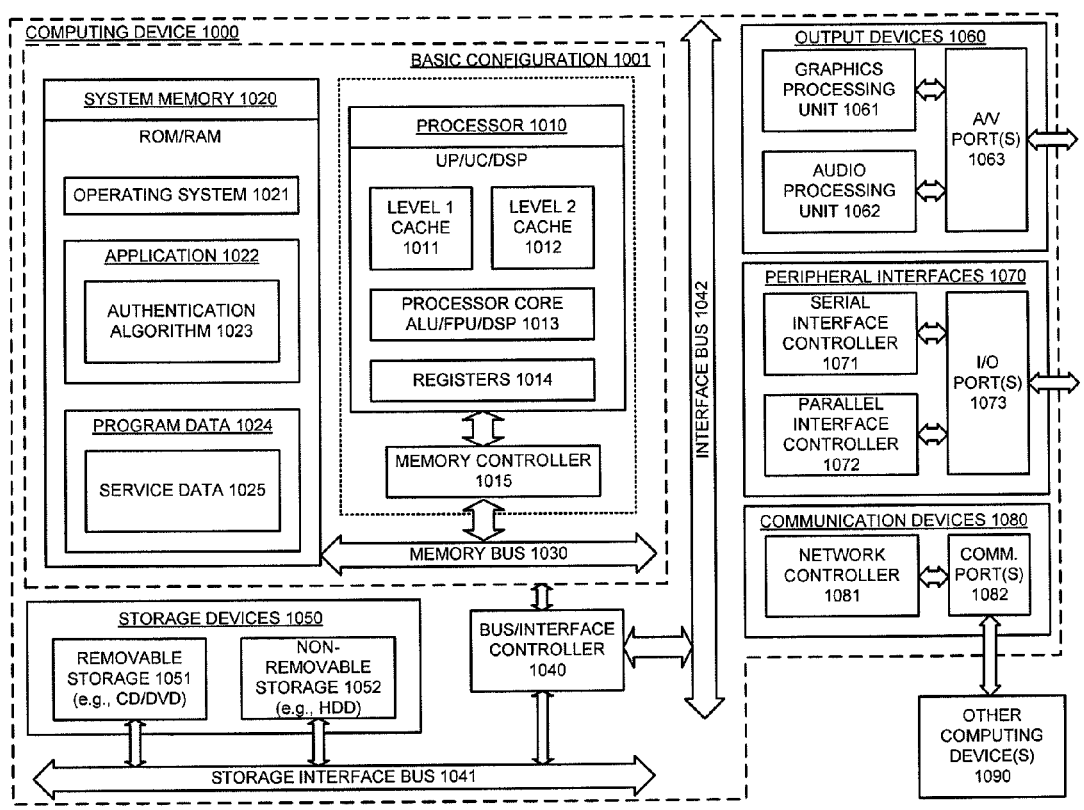
FIG. 8 is a circuit diagram of one aspect of a computing device according to an embodiment of the invention.

FIG. 8 is a circuit diagram of one aspect of a computing device 1000 that works in conjunction with the elements of the above Figures. In a very basic configuration of computing device 1000, the computing device 1000 typically includes one or more processors 1010 and a system memory 1020. A memory bus 1030 can be used for communications between the processor 1010 and the system memory 1020.

Depending on the desired configuration, the one or more processor 1010 of computing device 1000 can be of any type including but not limited to a microprocessor, a microcontroller, a digital signal processor, or any combination thereof. Processor 1010 can include one more levels of caching, such as a level one cache 1011 and a level two cache 1012, a processor core 1013, and registers 1014. The processor core 1013 can include an arithmetic logic unit (ALU), a floating point unit (FPU), a digital signal processing core (DSP Core), or any combination thereof. A memory controller 1015 can also be used with the processor 1010, or in some implementations the memory controller 1015 can be an internal part of the processor 1010.

Depending on the desired configuration, the system memory 1020 can be of any type including but not limited to volatile memory (such as RAM), non-volatile memory (such as ROM, flash memory, etc.) or any combination thereof. System memory 1020 typically includes an operating system 1021, one or more applications 1022, and program data 1024. Application 1022 includes an authentication algorithm 1023. Program Data 1024 includes service data 1025.

Computing device 1000 can have additional features or functionality, and additional interfaces to facilitate communications between the basic configuration 1001 and any required devices and interfaces. For example, a bus/interface controller 1040 can be used to facilitate communications between the basic configuration 1001 and one or more data storage devices 1050 via a storage interface bus 1041. The data storage devices 1050 can be removable storage devices 1051, non-removable storage devices 1052, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data System memory 1020, removable storage 1051 and non-removable storage 1052 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 1000. Any such computer storage media can be part of the computing device 1000.

Computing device 1000 can also include an interface bus 1042 for facilitating communication from various interface devices (e.g., output interfaces, peripheral interfaces, communication interfaces, etc.) to the basic configuration 1001 via the bus/interface controller 1040. Example output devices 1060 include a graphics processing unit 1061 and an audio processing unit 1062, which can be configured to communicate to various external devices such as a display or speakers via one or more A/V ports 1063. Example peripheral interfaces 1070 include a serial interface controller 1071 or a parallel interface controller 1072, which can be configured to communicate with external devices such as input devices (e.g., keyboard, mouse, pen, voice input device, touch input device, etc.) or other peripheral devices (e.g., printer, scanner, etc.) via one or more I/O ports 1073. An example communication device 1080 includes a network controller 1081, which can be arranged to facilitate communications with one or more other computing devices 1090 over a network communication via one or more communication ports 1082. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

It should be noted that the specifying circuit 112, the buffer specifier 114, the segmenter 311, the transformer 312, the periodogram computer 313, the delay assessment circuit 118, the pre-processors 110 and 111, the first and second threshold circuit 130 and 131, and/or the first and the second shift register 150, 151 may work in conjunction with computing device 600. In addition, it should be noted that the specifying circuit 112, the buffer specifier 114, the segmenter 311, the transformer 312, the periodogram computer 313, the delay assessment circuit 118, the pre-processors 110 and 111, the first and second threshold circuit 130 and 131, and/or the first and the second shift register 150, 151 may be comprised directly of the elements of computing device 1000 (i.e., elements 1010 and/or 1020).

Computing device 1000 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1000 can also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost versus efficiency tradeoffs. There are various vehicles by which processes and/or systems and/or other technologies described herein can be effected (e.g., hardware, software, and/or firmware), and the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation. In one or more other scenarios, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Exemplary embodiments are shown and described in the present disclosure. It is to be understood that the embodiments are capable of use in various other combinations and environments and are capable of changes or modifications within the scope of the inventive concept as expressed herein. Some such variations may include using programs stored on non-transitory computer-readable media to enable computers and/or computer systems to carry our part or all of the method variations discussed above. Such variations are not to be regarded as departure from the spirit and scope of the invention, and all such modifications as would be obvious to one skilled in the art are intended to be included within the scope of the following claims:

We claim:

1. A delay estimator for estimating a delay of a received signal between a reference point and a reception point, the delay estimator comprising:
 a delay assessment device configured to:
  receive quantized reference-point values and quantized reception-point values, wherein each combination pair of quantized reference-point values and quantized reception-point values is associated with a quantized state,
  associate a predetermined significance value with each combination pair of quantized reference-point values and quantized reception-point values based on the quantized state of that combination pair,
  compute an average weighted significance value for each candidate delay in a set of candidate delays by weighting said predetermined significance values associated with each combination pair and averaging said weighted significance values, wherein each of said combination pairs is represented by a quantized reference-point value evaluated at a first time instant and a quantized reception-point value evaluated at a second time instant, and wherein the first time instant and the second time instant are time shifted by the candidate delay, and
  select an estimated delay time from the set of candidate delays based on the computed average weighted significance values, wherein
  said delay assessment device provides a first estimated delay time at a first time instance and a second estimated delay time at a second time instance, said second time instance occurring at a time after said first time instance, and the estimated delay time selected from the set of candidate delays based on the computed average weighted significance values corresponds to said first estimated delay time; and a delay estimator selector configured to:
select one of the first estimated delay time and the second estimated delay time provided by the delay assessment device as a final estimated delay time based on a comparison between a quality metric computed for the first estimated delay time and the quality metric computed for the second estimated delay time.

2. The delay estimator according to claim 1, further comprising:
a quantizer for quantizing a quantity from the received signal with respect to a threshold to generate said received quantized reference-point values and said received quantized reception-point values.

3. The delay estimator according to claim 2, further comprising:
a first shift register storing the quantized reference-point values; and
a second shift register storing the quantized reception-point values.

4. The delay estimator according to claim 1, wherein each candidate delay in the set of candidate delays is a multiple of a time-distance between consecutive time intervals.

5. The delay estimator according to claim 1, wherein weights in said weighted significance values are based on the quantized reference-point values.

6. The delay estimator according to claim 1, wherein
the delay assessment device is configured to determine a significance value for each combination pair of quantized reference-point values and quantized reception-point values based on an expected probability of simultaneous occurrence of the quantized values contained in the combination pair.

7. The delay estimator according to claim 1, further comprising:
a first evaluator for evaluating the received signal at the reference point to generate reference-point values;
a second evaluator for evaluating the received signal at the reception point to generate reception-point values; and
a quantizer for quantizing said reference-point values and said reception-point values with respect to a threshold to generate said received quantized reference-point values and said received quantized reception-point values.

8. A delay estimator for estimating a delay of a received signal between a reference point and a reception point, the delay estimator comprising:
a first evaluator for evaluating the received signal at the reference point to generate reference-point values;
a second evaluator for evaluating the received signal at the reception point to generate reception-point values;
a first quantizer for quantizing said reference-point values with respect to a first threshold to generate quantized reference-point values;
a second quantizer for quantizing said reception-point values with respect to a second threshold to generate quantized reception-point values,
wherein each combination pair of quantized reference-point values and quantized reception-point values is associated with a quantized state;
a delay assessment circuit, wherein delay assessment circuit:

associates a first predetermined significance value with a first combination pair of quantized reference-point values and quantized reception-point values based on the quantized state of the first combination pair, associates a second predetermined significance value with a second combination pair of quantized reference-point values and quantized reception-point values based on the quantized state of the second combination pair, computes average weighted significance values for each candidate delay in a set of candidate delays by weighting said first and second predetermined significance values and averaging said weighted significance values, wherein each of said first and second combination pairs is represented by a quantized reference-point value evaluated at a first time instant and a quantized reception-point value evaluated at a second time instant, and wherein the first time instant and the second time instant are time shifted by the candidate delay, selects an estimated delay time from the set of candidate delays based on the computed average weighted significance values, and provides a first estimated delay time at a first time instance and a second estimated delay time at a second time instance, said second time instance occurring at a time after said first time instance, wherein the estimated delay time selected from the set of candidate delays based on the computed average weighted significance values corresponds to said first estimated delay time and a delay estimator selector configured to select one of the first estimated delay time and the second estimated delay time provided by the delay assessment circuit as a final estimated delay time based on a comparison between the first estimated delay time, the second estimated delay time, and a quality metric.

9. The delay estimator according to claim 8, wherein the delay assessment circuit:
associates a third predetermined significance value with a third combination pair of quantized reference-point values and quantized reception-point values based on the quantized state of the third combination pair, and
associates a fourth predetermined significance value with a fourth combination pair of quantized reference-point values and quantized reception-point values based on the quantized state of the fourth combination pair.

10. The delay estimator according to claim 9, wherein said delay assessment circuit:
assigns a significance value of a first value to one of said four combination pairs that is associated with a lowest probability of occurrence among four probabilities, and
assigns a significance value of a second value to three of said four combination pairs that is not associated with the lowest probability of occurrence among said four probabilities, the significance value of the second value is a greater value than the significance value of the first value.

11. The delay estimator according to claim 9, wherein said delay assessment circuit:
assigns a significance value of a first value to a first of said four combination pairs that is associated with a lowest probability of occurrence among four probabilities,
assigns a significance value of a second value to a second of said four combination pairs that is associated with a highest probability of occurrence among said four probabilities, the significance value of the second value is a greater value than the significance value of the first value, assigns a significance value of a third value to a third of said four combination pairs that is associated with a lower-middle probability of occurrence among said four probabilities and that is not associated with the lowest and the highest probability of occurrence among said four probabilities, the significance value of the third value is a value greater than the significance value of the first value and less than the significance value of the second value, and assigns a significance value of a fourth value to a fourth of said four combination pairs that is associated with a higher-middle probability of occurrence among said four probabilities and that is not associated with the lower-middle, the lowest, and the highest probability of occurrence among said four probabilities, the significance value of the fourth value is a value greater than the significance value of the first value and greater than the significance value of third value and less than the significance value of the second value.

12. A system, the system comprising:
a delay assessment device that receives quantized reference-point values and quantized reception-point values wherein each combination pair of quantized reference-point values and quantized reception-point values is associated with a quantized state, the delay assessment device comprising:
an associating unit for associating a predetermined significance value with each combination pair of quantized reference-point values and quantized reception-point values based on the quantized state of that combination pair,
a computing unit for computing average weighted significance values for each candidate delay in a set of candidate delays by weighting said predetermined significance values associated with each combination pair and averaging said weighted significance values, wherein each of said combination pairs is represented by a quantized reference-point value evaluated at a first time instant and a quantized reception-point value evaluated at a second time instant, and wherein the first time instant and the second time instant are time shifted by the candidate delay, and
a selector for selecting an estimated delay time from the set of candidate delays based on the computed average weighted significance values;
wherein said delay assessment device provides a first estimated delay time at a first time instance and a second estimated delay time at a second time instance, said second time instance occurring at a time after said first time instance, and wherein the estimated delay time selected from the set of candidate delays based on the computed average weighted significance values corresponds to said first estimated delay time;
a delay estimator selector for selecting one of the first estimated delay time and the second estimated delay time provided by the delay assessment device as a final estimated delay time based on a comparison between a quality metric computed for the first estimated delay time and the quality metric computed for the second estimated delay time; and
an adaptive filter for performing said echo canceling or said echo suppression, the adaptive filter comprising:
an adaptive filter input unit receiving an input audio signal at a reception-point, an audio signal at a reference-point and the estimated delay time;
an echo canceling or echo suppression unit performing said echo canceling or said echo suppression on said received audio input signal based on the estimated delay time; and
an adaptive filter output unit outputting an audio output signal, wherein the audio output signal is an altered version of said received audio input signal.

13. The system according to claim 12, wherein said received audio input signal is provided to said adaptive filter by a microphone.

14. A method for estimating a delay of a received signal between a reference point and a reception point, the method comprising:
receiving quantized reference-point values and quantized reception-point values wherein each combination pair of quantized reference-point values and quantized reception-point values is associated with a quantized state;
associating a predetermined significance value with each combination pair of quantized reference-point values and quantized reception-point values based on the quantized state of that combination pair;
computing average weighted significance values for each candidate delay in a set of candidate delays by weighting said predetermined significance values associated with each combination pair and averaging said weighted significance values, wherein each of said combination pairs is represented by a quantized reference-point value evaluated at a first time instant and a quantized reception-point value evaluated at a second time instant, and wherein the first time instant and the second time instant are time shifted by the candidate delay;
selecting an estimated delay time from the set of candidate delays based on the computed average weighted significance values;
providing a first estimated delay time at a first time instance and a second estimated delay time at a second time instance, said second time instance occurring at a time after said first time instance, wherein the estimated delay time selected from the set of candidate delays based on the computed average weighted significance values corresponds to said first estimated delay time; and
selecting one of the provided first estimated delay time and the second estimated delay time as a final estimated delay time based on a comparison between a quality metric computed for the first estimated delay time and the quality metric computed for the second estimated delay time.

15. A non-transitory computer-readable medium having computer-executable instructions stored thereon that, when executed by one or more processors, causes the one or more processors to perform operations comprising:
receiving quantized reference-point values and quantized reception-point values wherein each combination pair of quantized reference-point values and quantized reception-point values is associated with a quantized state;
associating a predetermined significance value with each combination pair of quantized reference-point values and quantized reception-point values based on the quantized state of that combination pair;
computing average weighted significance values for each candidate delay in a set of candidate delays by weighting said predetermined significance values associated with each combination pair and averaging said weighted significance values, wherein each of said combination pairs is represented by a quantized reference-point value evaluated at a first time instant and a quantized reception-point value evaluated at a second time instant, and wherein the first time instant and the second time instant are time shifted by the candidate delay;

selecting an estimated delay time from the set of candidate delays based on the computed average weighted significance values;

providing a first estimated delay time at a first time instance and a second estimated delay time at a second time instance, said second time instance occurring at a time after said first time instance, wherein the estimated delay time selected from the set of candidate delays based on the computed average weighted significance values corresponds to said first estimated delay time and selecting one of the provided first estimated delay time and the second estimated delay time as a final estimated delay time based on a comparison between a quality metric computed for the first estimated delay time and the quality metric computed for the second estimated delay time.

* * * * *